Figure 1:
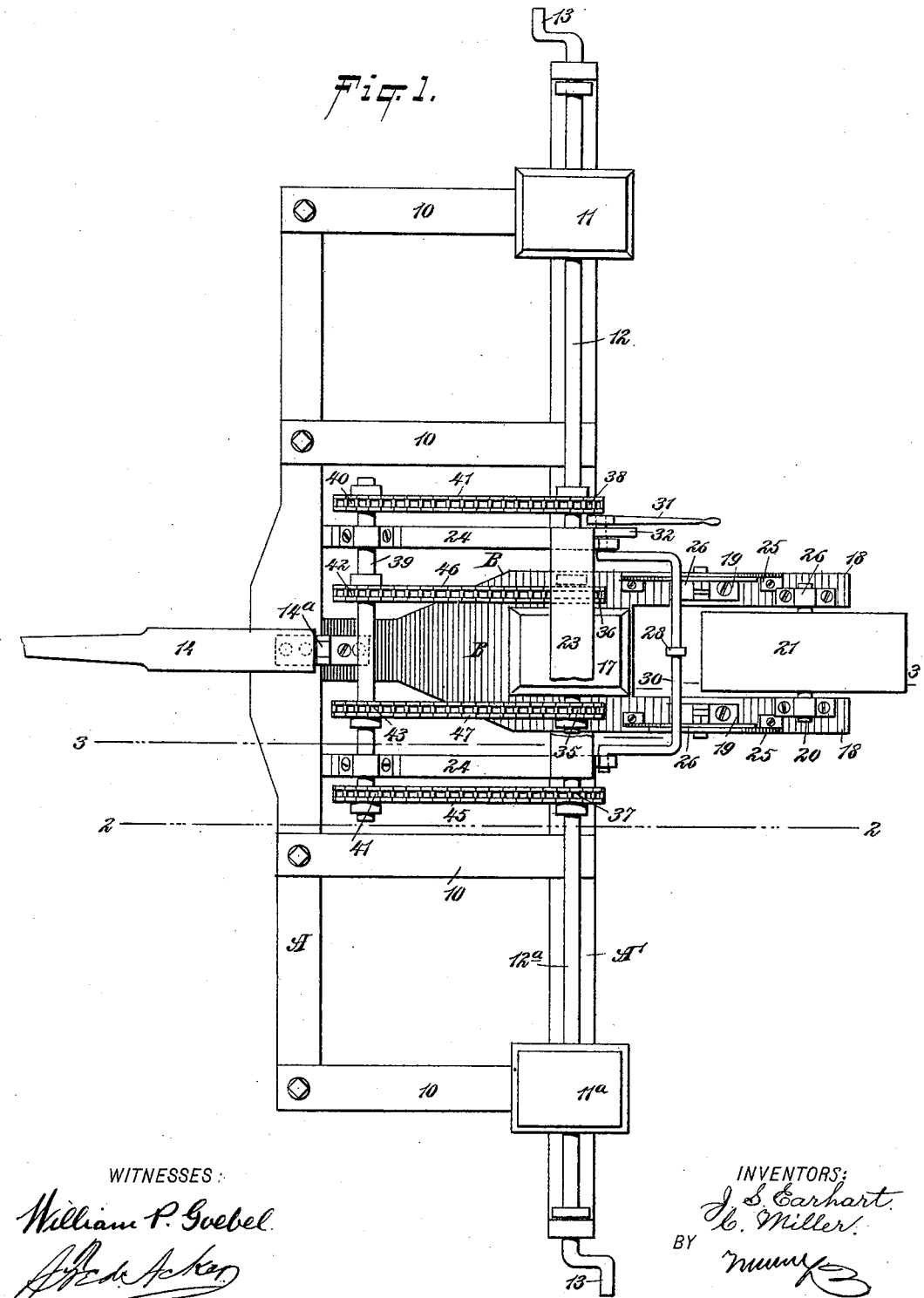

(No Model.) 2 Sheets—Sheet 1.

J. S. EARHART & C. MILLER.
PLANTER.

No. 587,190. Patented July 27, 1897.

WITNESSES:
William P. Goebel

INVENTORS:
J. S. Earhart
C. Miller
BY
ATTORNEYS.

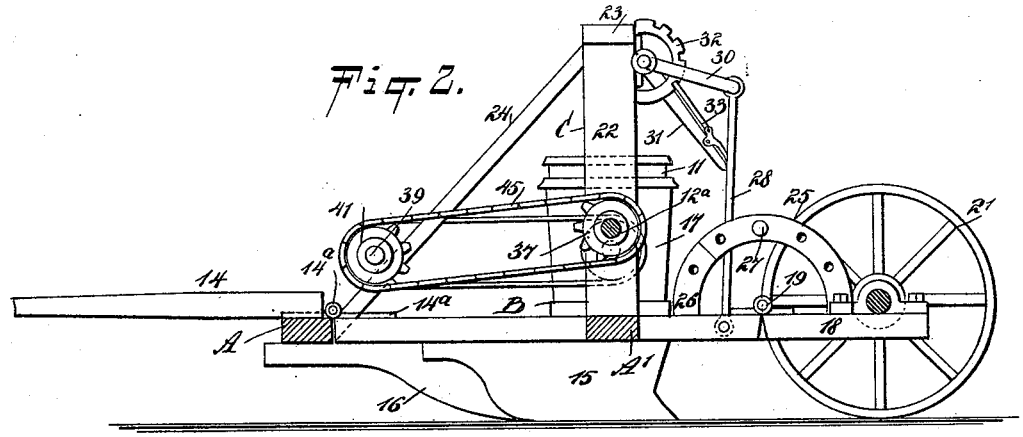
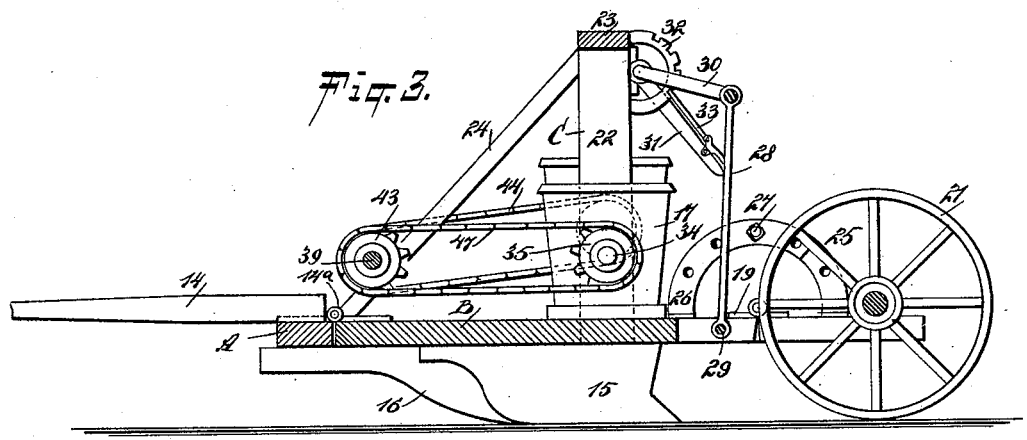
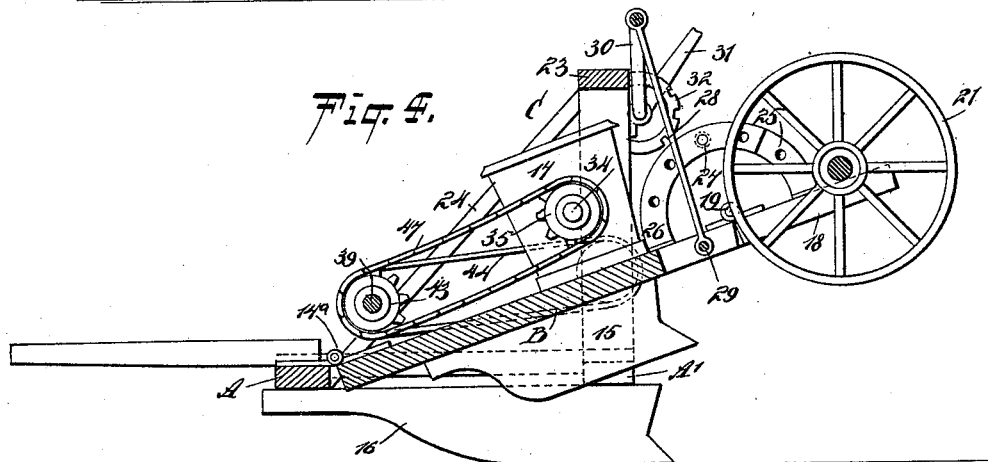

UNITED STATES PATENT OFFICE.

JOHN S. EARHART AND CHARLES MILLER, OF MILLERSVILLE, ILLINOIS.

PLANTER.

SPECIFICATION forming part of Letters Patent No. 587,190, dated July 27, 1897.

Application filed April 23, 1897. Serial No. 633,507. (No model.)

*To all whom it may concern:*

Be it known that we, JOHN S. EARHART and CHARLES MILLER, of Millersville, in the county of Christian and State of Illinois, have invented a new and useful Improvement in Planters, of which the following is a full, clear, and exact description.

The object of our invention is to construct a triple-row planter having the advantage of increasing the capacity of an ordinary planter about one-half.

A further object of the invention is to provide a central or middle planting mechanism which will be in a measure independent of the end planting mechanism and to so connect the central planting mechanism with the frame of the planter that the central planting mechanism may travel over uneven land without affecting the end planting devices.

Another object of the invention is to provide a means for regulating the depth of planting of the corn or other seed by the middle planter and thereby indirectly controlling the depth at which the seed shall be deposited by the end planters.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved planter. Fig. 2 is a transverse section on the line 2 2 of Fig. 1. Fig. 3 is a transverse section on the line 3 3 of Fig. 1, showing the middle planter in operative position; and Fig. 4 is a section on the same line as Fig. 3, showing the middle planter as raised from the ground.

The drawings illustrate the front section of what we term a "triple" corn-planter.

The frame as illustrated consists of a front and a rear runner-bar A and A', connected by suitably-disposed cross-bars 10. At each end of the frame, formed as described or otherwise formed, seedboxes are located, (designated, respectively, as 11 and 11$^a$,) and these seedboxes may be of any approved type and may have any desired form of dropping device applied. The dropping device of the seedbox 11 is controlled by a shaft 12, mounted upon the rear portion of the frame and terminating at one side of the center, while a similar shaft 12$^a$ is at the opposite side of the frame, serving to operate the dropping mechanism of the box 11$^a$. Each shaft 12 and 12$^a$ is shown as terminating at its outer end in a crank 13, adapted to be engaged by the projection of the ordinary check-wire, although the shafts 12 and 12$^a$ may be driven in other approved manner. Such driving devices, however, constitute no portion of the invention.

A pole 14 is secured to the front runner-bar A at its center, and immediately back of the pole an auxiliary frame B is hinged to the front runner-bar of the main frame, the hinge being designated as 14$^a$. The auxiliary frame B is provided with a runner 15 at its bottom, as shown in Figs. 2, 3, and 4, while runners 16 are utilized to support the end portions of the main frame, as is also shown in said Figs. 2, 3, and 4. The third or intermediate seedbox 17 is placed upon the middle or auxiliary frame B, and the rear end of this frame, which projects considerably beyond the rear of the main frame, is bifurcated, the members whereof are designated as 18, as shown particularly in Fig. 1. The members 18 of the auxiliary or middle frame B are made in two sections, and the sections are connected by hinges 19, as is also shown in Fig. 1. Upon the rear section of each member 18 of the middle or auxiliary frame a box or bearing 20 is secured, in which the trunnions of a wheel 21 are mounted to turn. A vertical frame C is erected upon the rear runner-bar A' of the main frame and extends rearward. The standards 22 of the upright frame C are secured to the inner ends of the sections of the rear runner-bar A', being connected at the top by a cross-bar 23, and the upright frame C is strengthened by braces 24, which extend, preferably, from the upper portions of the standards 22 forwardly to a connection with the front runner-bar A of the main frame, as is also shown in Fig. 1.

The depth to which the seed is to be planted by the planting mechanism of the intermediate or middle seedbox is controlled by two segments 25 and 26, located at each side of the auxiliary or middle frame B, the segments 26 being attached to the forward sections of the members 18, while the other segments 25 are secured to the rear sections of the members 18, the segments of the two sets being held to slide one against the other. These segments are provided with apertures through which bolts or their equivalents may be passed, as shown in Figs. 2, 3, and 4, so as to hold the runner 15 a greater or a less distance from the ground.

At times it is necessary that the middle seedbox and its supporting-frame should be elevated entirely from connection with the ground, as illustrated in Fig. 4. Such an adjustment is readily accomplished through the medium of a link 28, which is attached to a cross-bar 29 at the bifurcated portion of the frame B, the link 28 being pivoted to a crank-shaft 30, which is journaled upon the upright frame C. This shaft at one of its ends carries a handle 31, also in the nature of a crank, and the said handle is provided with the usual thumb-latch 33, arranged for engagement with a rack 32, supported upon the aforesaid upright frame.

A shaft 34 is passed through the seedbox, operating the dropping mechanism in any approved manner, and the said shaft 34 is provided at each of its ends, outside of the seedbox, with a wheel, preferably a sprocket-wheel, said wheels being designated, respectively, as 35 and 36. At the inner end of the shaft 12ᵃ a sprocket-wheel 37 is secured, while at the inner end of the shaft 12 a similar wheel 38 is fastened. At the front lower portion of the braces 24 of the upright frame a driven shaft 39 is journaled in suitable bearings. This driven shaft is provided at one end with a sprocket-wheel 40 in transverse alinement with the sprocket-wheel 38 on the shaft 12 and is provided at the opposite end with a sprocket-wheel 41, which in turn is in alinement with the sprocket-wheel 37 on the shaft 12ᵃ. The shaft 39 is provided with two more sprocket-wheels 42 and 43, the sprocket-wheel 42 being in transverse alinement with the sprocket-wheel 36 on the shaft of the central seedbox, while the sprocket-wheel 43 transversely alines the sprocket-wheel 35 on the same shaft. The wheels 40 and 38 are connected, preferably, by chain belts 44, the wheels 41 and 37 being connected by chain belts 45, and the wheels 42 and 36 are connected by chains 46, while the wheels 43 and 35 are connected by a chain belt 47. Thus it will be observed that the driving mechanism on each side of the center of the main frame is the same—that is to say, each of the shafts 12 and 12ᵃ have the same driving connection with the shaft 34, controlling the drop of the seed from the central seedbox.

Having thus described our invention, we claim as new and desire to secure by Letters Patent—

1. The combination, with a pair of seedboxes and supports therefor, of a central seedbox, a support for the central box capable of being raised and lowered, and being also independent of the support for the pair of boxes, and a driving connection between the distributing mechanism of the pair of boxes and the central box.

2. In a planter, a frame, seedboxes located at the ends of the frame, an auxiliary frame having a hinged connection with the main frame intermediate of the seedboxes thereof, a third seedbox located on the auxiliary frame, means for raising and lowering the auxiliary frame, and a mechanism, substantially as described, for operating the seed-dropping device of the intermediate seedbox from the mechanism controlling the dropping of the seed in the end seedboxes.

3. The combination, with a main frame, seedboxes carried by the main frame, and a mechanism for controlling the dropping of the seed from said seedboxes, of an auxiliary frame attached to the main frame, extending rearwardly beyond the same, an intermediate seedbox secured upon the auxiliary frame, an adjustable roller carried by the auxiliary frame, controlling the depth at which the seed shall be planted from the intermediate seedbox, and means for operating the seed-dropping mechanism for the intermediate seedbox.

4. The combination, with a main frame, seedboxes carried by the main frame, and a mechanism for controlling the dropping of the seed from said seedboxes, of an auxiliary frame attached to the main frame, extending rearwardly beyond the same, an intermediate seedbox secured upon the auxiliary frame, an adjustable roller carried by the auxiliary frame, controlling the depth at which the seed shall be planted from the intermediate seedbox, means for operating the seed-dropping mechanism for the intermediate seedbox, a crank-shaft supported by the main frame, a connection between the crank-shaft and the auxiliary frame, and a locking device for the crank-shaft, whereby the auxiliary frame and all parts carried thereby may be raised or lowered.

5. The combination, with the main frame of a planter, seedboxes near the ends thereof, and a driving mechanism for the dropping devices of said end seedboxes, of an auxiliary frame having a hinged connection with the main frame and extending rearwardly beyond the same, the rear portion of the auxiliary frame being bifurcated and the bifurcated portion being constructed in hinged sections, adjustable engaging segments carried by connecting-sections of the bifurcated portion of the auxiliary frame, locking devices adjustably connecting engaging segments, a wheel journaled between the outer bifurcated sections of the auxiliary frame and seedboxes carried by said frame, and a driving connection between the seed-controlling mechanism of the end boxes and the seed-controlling mechanism of the intermediate box.

6. The combination, with the main frame of a planter, seedboxes near the ends thereof, and a driving mechanism for the dropping devices of the said end seedboxes, of an auxiliary frame having a hinged connection with the main frame and extending rearwardly beyond the same, the rear portion of the auxiliary frame being bifurcated and the bifurcated portion being constructed in hinged sections, adjustable engaging segments carried by connecting-sections of the bifurcated portion of the auxiliary frame, locking devices adjustably connecting engaging segments, a wheel journaled between the outer bifurcated sections of the auxiliary frame and seedboxes carried by said frame, a driving connection between the seed-controlling mechanism of the end boxes and the seed-controlling mechanism of the intermediate box, a shaft carried by the main frame above the auxiliary frame, a connection between said shaft and auxiliary frame, whereby the latter may be raised and lowered, a shifting-handle for said shaft, and a locking device for the handle.

JOHN S. EARHART.
CHARLES MILLER.

Witnesses:
S. J. MILLER,
W. W. DENTON.